United States Patent [19]

Land et al.

[11] Patent Number: 5,615,974
[45] Date of Patent: Apr. 1, 1997

[54] PROCESS FOR SOIL DECONTAMINATION BY OXIDATION AND VACUUM EXTRACTION

[75] Inventors: Christopher A. Land, Newton, N.J.; Joseph A. Pezzullo, Langhorne, Pa.; James J. Malot, Dorado, Puerto Rico; Louis C. Papa, Cherry Hill, N.J.; Daniel Oberle, Sylvania, Ohio

[73] Assignee: Terra Vac, Inc., San Juan, Puerto Rico

[21] Appl. No.: 211,559

[22] PCT Filed: Feb. 4, 1994

[86] PCT No.: PCT/US94/01315

§ 371 Date: Apr. 4, 1994

§ 102(e) Date: Apr. 4, 1994

[87] PCT Pub. No.: WO95/21034

PCT Pub. Date: Aug. 10, 1995

Related U.S. Application Data

[63] Continuation of Ser. No. 987,445, Jan. 7, 1992, abandoned.
[51] Int. Cl.[6] ........................................................ B09B 3/00
[52] U.S. Cl. ............................................ 405/128; 405/263
[58] Field of Search .................................. 405/128, 129, 405/131, 258, 263; 588/249

[56] References Cited

U.S. PATENT DOCUMENTS 4,593,760  6/1986  Visser ..................................... 166/267
4,915,452  4/1990  Dibble ..................................... 299/17

*Primary Examiner*—George A. Suchfield

[57] ABSTRACT

A process for in situ treatment of a contaminated subsurface zone of the earth containing volatile liquid or semisolid organic contaminants, semivolatile liquid or semisolid organic contaminants and/or nonvolatile organic contaminants in liquid, semisolid and/or solidified form which comprises treating said contaminants with an oxidant such as hydrogen peroxide and conducting vacuum extraction to remove volatilized contaminants, volatilized oxidation products of contaminants and/or liquid oxidation products of contaminants. The oxidant application may be made in a contaminated subsurface vadose zone, a contaminated subsurface capillary fringe or beneath the surface of a contaminated water table. Vacuum extraction may be conducted in the contaminated zone itself or, in the vadose zone directly above the contaminated capillary fringe or the contaminated water table and may be utilized, e.g., to withdraw water containing oxidation products of contaminants. The treatment may enhance natural biodegradation of some contaminants and may be conducted in a variety of ways.

23 Claims, 4 Drawing Sheets

PROCESS FOR SOIL DECONTAMINATION BY OXIDATION AND VACUUM EXTRACTION

CROSS-REFERENCE TO RELATED APPLICATION

This application is a continuation of application Ser. No. 07/987,445, filed Jan. 7, 1992 (now abandoned), through international application Ser. No. PCT/US94/01315, filed Feb. 4, 1994, that designates the United States.

FIELD OF THE INVENTION

This invention relates to an oxidation and vacuum extraction process for in situ removal of subsurface contaminants.

BACKGROUND OF THE INVENTION

Sources of subsurface contamination are numerous, for example, leaky underground storage tanks, industrial and manufacturing operations, chemical storage and process areas, chemical spills and waste disposal areas. Among common contaminants from these sources are petroleum hydrocarbons, such as benzene, toluene and xylene, gasoline, diesel, jet fuel and others; chlorinated hydrocarbons, such as trichloroethylene (TCE), tetrachloroethylene (PCE), chlorobenzene and chlorophenols; and other volatile, semi-volatile and non-volatile organic compounds. Once such contaminants are within the vadose zone they can leach down into the groundwater table and become long term sources of groundwater contamination which typically persist for decades. The vadose zone, also known as the zone of aeration, is the unsaturated zone of the soil that is above the groundwater table and the capillary fringe (i.e., the transition zone between the vadose zone and the groundwater table). Typically, the capillary fringe has about a 75% to about a 90% water content and the vadose zone has from about a 30% to about a 50% water content. In order to protect groundwater resources and provide unrestricted use of land and groundwater, clean-up of subsurface contamination is necessary at many sites.

One well known process in the field of subterranean environmental clean-up is the process of vacuum extraction. [See U.S. Pat. No. 4,593,760 by Visser and Malot, issued Jun. 10, 1986, on which a Reexamination Certificate was granted Jun. 20, 1989; and U.S. Pat. No. Reissue 33,102 by Visser and Malot, issued Oct. 31, 1989.] The vacuum extraction process removes volatile and semi-volatile organic compounds, petroleum hydrocarbons, and other liquid contaminants from the vadose zone. In the vacuum extraction process, a subsurface vacuum enhances volatilization of volatile organic compounds in the subsurface, and the vacuum induced air flow removes these volatilized contaminants from contaminated soil.

The vacuum extraction process typically works faster on compounds of higher vapor pressure (i.e., greater than or equal to 1 mm Hg at 20° C.) than those of lower vapor pressure (i.e., less than about 1 mm Hg at 20° C.). Compounds with low vapor pressures have been removed successfully by vacuum extraction, but at a slower removal rate than that of higher vapor pressure volatile organic compounds. In cases where the subsurface is contaminated with a dense non-aqueous phase liquid (DNAPL), such a compound, being more dense than water, tends to sink deep into the subsurface and even into or below the groundwater aquifer. Once the DNAPLs are in or below the groundwater aquifer, they are generally considered untreatable.

Because of its oxidation potential, hydrogen peroxide, and more specifically, the hydroxyl radical, is known to be an effective treatment method for removal of contaminants from soils and waste streams. [See Schneider, D. R. and Billingsley, R. J., "Bioremediation—A Desk Manual for the Environmental Professional," Pudvan Pub. Co., Northbrook, Ill., pp. 60–61 (1990); Watts, R. J., Solomon, W. L., and Udell, M. D., "Treatment of Contaminated Soils Using Catalyzed Hydrogen Peroxide," Dept. of Civil Eng., Washington State Univ. (1990); Watts, R. J., Udell, M. D., Rauch, P. A. and Leung, S. W., "Treatment of Pentachlorophenol-Contaminated Soils Using Fenton's Reagent," Hazardous Waste & Hazardous Materials, Vol. 7, No. 4 (1990); and Watts, R. J., "Hydrogen Peroxide for Physicochemically Degrading Petroleum-Contaminated Soils," Remediation Magazine, pp. 413–425 (1992).] The oxidation potential of hydrogen peroxide is also a well known phenomenon and has been studied since the turn of the century. The basic reaction is the oxidation of an organic molecule, such as a hydrocarbon, phenol or a chlorinated compound, to form a variety of oxidized products. [See Sedlak, D. L. and Andren, A. W., "Oxidation of Chlorobenzene with Fenton's Reagent," Environ Sci Technol, Vol 25, No. 4 (1991); and Walling, C. and Johnson, R. A., "Fenton's Reagent. V. Hydroxylation and Side-Chain Cleavage of Aromatics", Dept. of Chemistry, Univ. of Utah (1974).] In a complete oxidation reaction, one by-product might be carbon dioxide ($CO_2$), or if the oxidation is an incomplete reaction, then by-products might include alcohols, aldehydes or carboxylic acids, all of which are very biodegradable. In the present invention the oxidation of subsurface contaminants by hydrogen peroxide generates no toxic byproducts, is environmentally benign, and the hydrogen peroxide itself may be degraded by subsurface microbial enzymes.

Hydrogen peroxide reacts with iron ($Fe^{2+}$) to produce hydroxyl radical (OH·) which is commonly referred to as Fenton's reaction (other possible catalysts are copper and nickel). Fenton's reaction produces the hydroxyl radical which, being a strong oxidizer, can be utilized to treat subsurface contaminants. Fenton's reaction is commonly written as:

$$H_2O_2 + Fe^{2+} \rightarrow OH\cdot + OH^- + Fe^{3+}.$$

This type of reaction is catalyzed when hydrogen peroxide contacts naturally occurring iron contained in soil and rock. Remediation of contaminated soils and waste streams has been done on a bench scale by means of Fenton's reaction. (Supra, Watts et al. (1992).] Watts et al. applied Fenton's reagent (pre-mixed iron and hydrogen peroxide) to excavated, contaminated soils contained in open drums. The results showed that soil contamination levels of several thousand milligrams per kilogram (ppm) of total petroleum hydrocarbon were reduced to below 100 mg/kg within a few days. However, the prior art does not address methods to capture the offgases which are produced from the oxidation reaction.

Most prior art methods of treating contaminated soil involve excavation and treatment of the soil on- or off-site by means such as incineration or chemical treatment. However, when soil contaminated with volatile organic compounds is excavated, up to about 90% of the contaminants volatilize to the atmosphere. Many of these prior art methods are ex situ and most all of these methods release the volatilized contaminants into the atmosphere with the disadvantages attendant thereto, such as adverse environmental or health impacts or other effects. Not only are these prior art methods expensive, but also, in many cases the prior art methods are not practicable. For example, if the contaminated soil is beneath developed or arable land, then excavation of the soil for treatment is not a viable alternative. However, one widely recognized technique for in situ clean-up of soil contaminated with volatile organic compounds is the vacuum extraction process of Visser and Malot, supra. These two patents issued to Visser and Malot do not recognize nor suggest the synergy between the oxidation step and the vacuum extraction step of the process of the present invention which results in a more efficient clean-up of contaminated media. In the process of the present invention, contaminated media may include, but are not limited to, soil, groundwater, waste streams, landfills, rock, etc.

Every contaminated media site has its own unique characteristics with regard to the type of contaminant, the complexities of the subsurface topography, the soil and rock location, etc. Accordingly, it is impossible to generalize or predict from laboratory experiments, for example, those of Watts et al., supra, what will happen in a clean-up situation at a particular contaminated media site.

In contrast to most of the prior art methods, the present invention is an in situ process for removal of subsurface contaminants. In the process of the present invention, the contaminants are subjected to oxidation. The heat produced by the oxidation reaction causes volatilization of the contaminants. These contaminants are then withdrawn from the subsurface by means of vacuum extraction. The process of the present invention is advantageous, because the process is performed in situ and, therefore, is more cost effective than prior art methods which require excavation of the contaminated soil. Additionally, the process of the present invention is environmentally benign, because the volatilized contaminants can be, preferably, recovered and treated and not released into the atmosphere.

SUMMARY OF THE INVENTION

The present invention involves a process for removing contaminants from a subsurface contaminated medium which comprises introducing an oxidant to the contaminated medium to oxidize and volatilize the contaminants and applying, preferably simultaneously, vacuum extraction to the contaminated medium to remove the oxidized and volatilized compounds. The removed, volatilized contaminants may be discharged into the atmosphere, but more preferably, are collected, or, most preferably, are collected and treated to render the contaminants harmless.

The oxidant may be introduced to the contaminated medium by surface application, subsurface conduit injection, or subsurface pressure injection. In a preferred embodiment, the oxidant is introduced to the contaminated medium by subsurface pressure injection by cutting at least one circular, disk-shaped swath in the subsurface. The oxidant may be any environmentally safe and acceptable oxidant, but preferably, is hydrogen peroxide.

Vacuum extraction is applied to the contaminated medium by installing at least one conduit into the contaminated medium from a surface or subsurface excavation, applying a vacuum extraction means to the surface-most end of the conduit and operating the vacuum extraction means to remove the volatilized contaminants from the contaminated medium through the conduit.

In yet another preferred embodiment, the step of introducing the oxidant generates heat and oxygen and the oxidant is of an optimum concentration to enhance biodegradation of the contaminants. Also, the step of operating the vacuum extraction means controls the heat, preferably, at a temperature of from about 10° C. to about 35° C., and provides and disperses oxygen throughout the contaminated medium to enhance biodegradation of the contaminants.

DETAILED DESCRIPTION OF THE INVENTION

Figure 1:
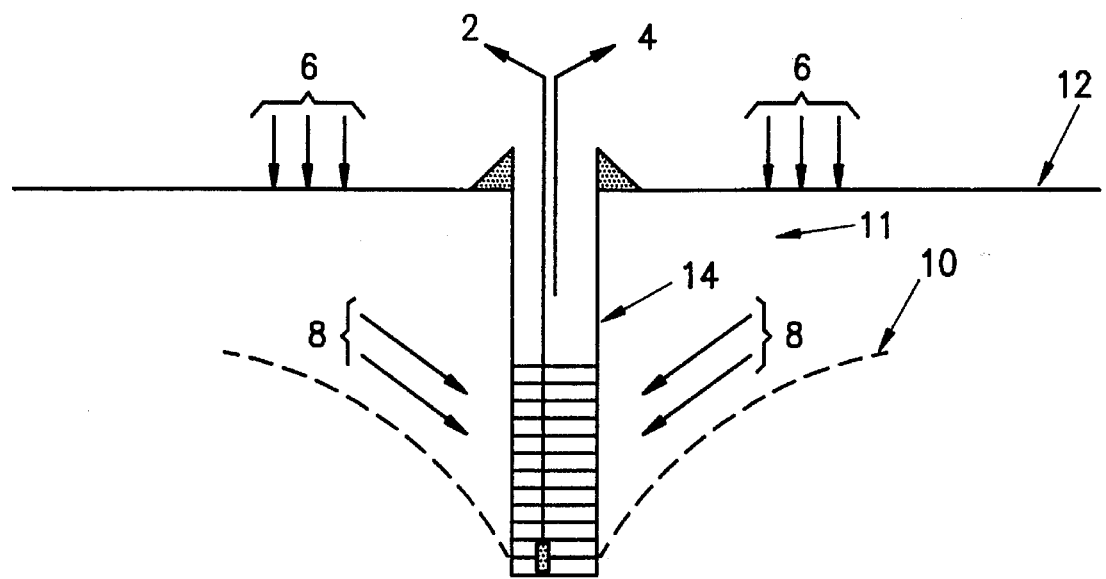
FIG. 1 is a cross-sectional depiction of application at surface 12 of an oxidant 6 and vacuum extraction 4 through a conduit 14 from the vadose zone 11 of the resulting oxidized and volatilized contaminants 8. A groundwater extraction system 2 may be used to lower the groundwater table 10.

The process of the present invention involves two fundamental process steps: 1) oxidizing subsurface contaminants to generate heat and oxygen which volatilize and degrade the contaminants; and 2) applying, preferably simultaneously, vacuum extraction to the vadose zone to remove the volatilized contaminants and their oxidation products from the subsurface. There is a synergy between the oxidation step and the vacuum extraction step which results in an overall increase in the clean-up rate of the contaminated medium and a decrease in clean-up costs because the process steps mutually enhance each other.

Chemical oxidation is a process in which the oxidation state of a substance is increased, or to state it another way, the substance loses electrons. Oxidizing agents usually supply oxygen as the electron acceptor in oxidation reactions. However, other electron acceptors can be used. In the process of the present invention any oxidant is suitable. The preferred oxidant is hydrogen peroxide.

In a preferred embodiment of the present invention, hydrogen peroxide, with or without Fenton's reagent, may be the oxidant. Fenton's reagent is a broad term used to describe that compound which results from the combination of an acidic solution, such as hydrogen peroxide, with a ferrous salt. Fenton's reagent may be pre-made in the laboratory and applied to the contaminated medium, but generally there is sufficient naturally occurring iron (or other catalysts, such as copper or nickel) in the subsurface to catalyze the reaction. As previously mentioned, the oxidation reaction with hydrogen peroxide generates what Watts et al. term the "hydroxyl radical" (OH·) and this hydroxyl radical (as it will be referred to herein throughout) is believed to be a particularly effective means by which to degrade and volatilize contaminants, such as petroleum hydrocarbons and volatile, semi-volatile and nonvolatile organic compounds. Fenton's reaction generates heat and the heat generated helps to volatilize contaminants which might not initially react. Furthermore, the heat and oxygen generated help to biodegrade these contaminants.

Oxidation reactions are exothermic. Accordingly, during the oxidation step of the process of the present invention, the contaminated soil may reach temperatures of about 93.3° C. In one experiment conducted by the inventors in a low permeability soil ($k \approx 10^{-6}$ cm/sec), at about one foot away from the site of introduction of the oxidant recorded temperatures were more than about 200° F. Permeability (k) is a property of soil, rock or other medium which describes the medium's ability to transmit fluids or gases. Permeability is expressed in many different units, commonly as cm/sec. At about five feet away from the site of introduction of the oxidant, soil temperatures rose about 12.2° C. above ambient. This temperature phenomenon is dependent upon and can be correlated to the type and concentration of the oxidant, contaminants and properties of the contaminated medium. For instance, one would expect a higher temperature rise, more quickly, throughout a larger volume of soil, rock or other medium, if that medium has a higher permeability, and possibly also, porosity. Porosity is a measure of the percentage of the void fraction of a particular medium. Typically, after introduction of the oxidant to the contaminated medium, the temperature of that medium rises rather rapidly and then declines slowly over time back to ambient. In certain cases, the reaction may be sustained by constant injection of oxidant.

Figure 5:
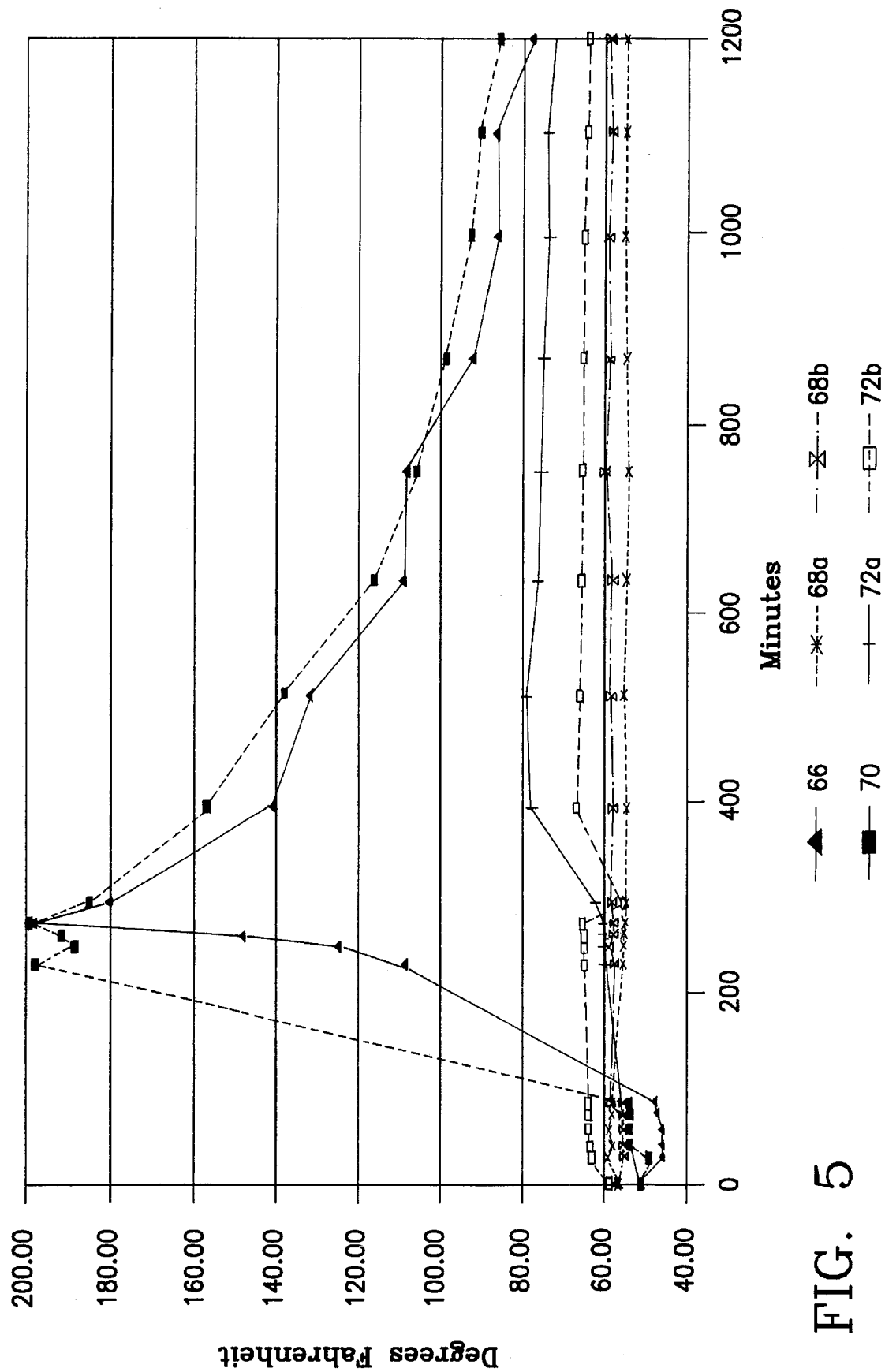
FIG. 5 is a graphical depiction of the exothermic nature of the oxidation step of the process of the present invention.

FIG. 5 demonstrates this temperature phenomenon as it occurred in an experiment conducted by the inventors in which a horizontal conduit parallel to the surface was used to introduce an oxidant to a contaminated medium. Thermocouples were placed below the surface to measure the variations in temperature in degrees Fahrenheit of the oxidation reaction over time. Thermocouples were placed, and temperature readings taken, at the following locations: (1) at the oxidant injection site and at a depth of about four feet 66; (2) at a distance of about two and a half feet from the oxidant injection site and at a depth of about five and a half feet 68a and at a depth of about three feet 68b; (3) at a position directly above the oxidant injection site and at a depth of about two and a half feet 70; and (4) at a distance of about one and a half feet from the oxidant injection site and at a depth of about three feet 72a and at a depth of about six feet 72b.

In a preferred embodiment of the present invention, the hydrogen peroxide, specifically the hydroxyl radical, not only oxidizes contaminants, but also oxygenates the contaminated medium. The oxygen ($O_2$) generated in the oxidation reaction by degradation of hydrogen peroxide itself provides for long term biodegradation of subsurface contaminants. Also, the heat generated in the oxidation reaction promotes the growth in the subsurface of microorganisms which biodegrade the contaminants.

In order to maintain the viability of the microorganisms, the heat generation of the oxidation reaction must be controlled and the oxygen generated by the oxidation reaction must be dispersed. The heat generation may be controlled by the vacuum extraction means, because the vacuum creates a negative pressure gradient, thereby drawing ambient air through the media. Therefore, the rate of air flow through the vacuum extraction means may be balanced with the rate of oxidant injection, as well as with the oxidant concentration, to control the subsurface temperature. The vacuum extraction means also serves to disperse the oxygen generated by the oxidation reaction throughout the contaminated medium. By using the vacuum extraction means to control the heat generation and to disperse the generated oxygen, optimum conditions may be created for biodegradation of the contaminants by the subsurface microorganisms.

Although whether biodegradation occurs is very site specific and dependent on many factors, biodegradation is a measurable phenomenon and biodegradation conditions may be fostered by controlling the oxidation and vacuum extraction process steps of the present invention to enhance biodegradation. Most subsurface microorganisms can survive at temperatures from about 0° C. to about 43° C. and some can even survive under extreme hot or cold temperature conditions. However, the ideal temperature range for optimal microorganism activity is from about 10° C. to about 35° C. and most preferably, from about 10° C. to about 26.7° C. There is a significant decline in or cessation of microorganism activity at about 43.3° C. or greater, or at about 0° C. or less. As previously discussed, the vacuum extraction process step may be controlled in order to create and control desired temperature conditions in the contaminated medium.

If the oxidant content, that is the amount of oxidant and the oxidant solution concentration, is too high, then the oxidant may prove fatal to the subsurface microorganisms. Thus, to enhance biodegradation, it is important that the oxidant solution introduced to the contaminated medium be at a non-fatal or optimum content with respect to the microorganisms in order to maintain viability of the microorganisms. An optimum content of the oxidant will be site specific and will depend on various factors, such as the oxidant, the contaminated medium, the type and amount of contaminants, the type and amount of microorganisms present in the medium, the vacuum extraction system, etc. Therefore, the optimum content of oxidant for a particular site must be determined empirically on a site by site basis.

Low pH medium conditions, preferably from about pH 2 to about pH 3, are most suitable for an optimum oxidation during Fenton's reaction. The total time of the oxidation reaction depends on, among various other factors, the amount of oxidant applied to the contaminated medium, the concentration of the oxidant solution applied to the contaminated medium, the type of contaminated medium, the amount of catalyst present in the contaminated medium, the physical characteristics of the contaminated medium, the type and concentration of contaminant, the pH of the medium and others.

In the process of the present invention, an oxidant may be introduced to a contaminated medium by surface application or subsurface injection. The application or injection of the oxidant may be administered by one or more batches or continuously. Also, the oxidant may be injected into an existing borehole or conduit, or the oxidant may be injected at the same time as the drilling, augering or boring of a borehole or conduit. Alternatively, the oxidant may be introduced to a contaminated medium by a means, such as a soil mixing tool, which will simultaneously introduce the oxidant to and mix the oxidant with the contaminated medium. As previously mentioned, after oxidation the contaminants may be volatilized. These volatilized contaminants may escape into the atmosphere with all the attendant disadvantages thereof if not captured. Accordingly, the vacuum extraction step of the present invention is a means by which to capture the volatilized contaminants and their volatile oxidation products, as well as to assist in their volatilization and removal from the contaminated medium.

There are many ways to capture the volatilized contaminants. For example, the volatilized contaminants discharged from the vacuum extraction means may be flowed through a condenser where water vapor and some or all of the volatilized contaminants that are contained in the discharged matter may be condensed. The condensate may be flowed into a storage tank and the volatilized contaminants discharged into the ambient air through a stack. When discharge of the volatilized contaminants into the ambient air is not feasible because of adverse environmental or health impacts or other reasons, the contaminants can be treated by known methods to render the contaminants harmless. Among the known treatment methods are absorption (for example, by activated carbon), oxidation or other mechanical, physical, chemical or biological treatment. If the contaminants are useful substances, then they can be collected for future use.

The prior art applied vacuum extraction for the treatment of volatile and semi-volatile organic contaminants contained in the vadose zone. The present invention is applicable to the removal from the subsurface of not only volatilized organic contaminants, but also semi-volatile organic compounds, some non-volatile organic compounds and to other volatile, semi-volatile, non-volatile and inorganic compounds, such as cyanide, contained in the vadose zone, as well as in the zone below the groundwater table.

A semi-volatile liquid is considered to be a compound with no material volatilization at normal ambient temperatures, normally this has a vapor pressure of less than about 1 mm Hg at 20° C. In an in situ test of the present invention, the following semi-volatiles were extracted from the vadose zone, and they serve as examples of some of the semi-volatiles that may be extracted, including, but not limited to: dichlorobenzene, phenols, and trichloropropane (TCP).

In the present invention, vacuum extraction provides oxygen to the contaminated medium. Vacuum extraction can deliver in situ to a contaminated medium large volumes of air which contain greater than about 200,000 ppm oxygen, thereby providing a direct oxidation pathway. The delivery of oxygen improves the degradation process and results in a reaction which, in the preferred embodiment, requires less hydrogen peroxide per unit volume of contaminated medium than without vacuum extraction.

Prior art does not address the simultaneous application of oxidation and vacuum extraction processes to the subsurface as a recovery method to clean-up in situ contaminated soil, rock or other media. The oxidation and vacuum extraction processes have a synergistic relationship when applied simultaneously. The oxidation reaction generates heat, thereby increasing the temperature of the contaminated medium. The increase in the contaminated medium temperature enhances the biodegradation and volatilization and elevates the vapor pressure of the contaminants. All of these factors bolster the ability of the vacuum extraction process to remove the contaminants from the medium. Furthermore, the vacuum extraction process provides a means to disperse the oxidant throughout the contaminated medium and to introduce oxygen to the contaminated medium which may assist in the oxidation reaction and biodegradation, withdraw contaminants from the medium where they can be safely handled or treated, and prevent migration of volatilized, but non-oxidized, contaminants to the surface or into the atmosphere. During one laboratory bench scale test conducted by the inventors, the contaminated medium temperatures exceeded about 93.3° C. at times and the removal rate of volatile organic compounds by the vacuum extraction system increased about 100%. Overall, there was a reduction in contaminant concentration of about 90% over the entire contaminated medium volume which was treated with about a 30% hydrogen peroxide solution.

The process of the present invention of simultaneous oxidation and vacuum extraction may be applied ex situ, for example to previously excavated contaminated soil piles. The process of the present invention may also be applied in situ by introduction of the oxidant to the surface of the contaminated medium or injection into the subsurface of the contaminated medium. The subsurface oxidant introduction may be into the vadose zone, the capillary fringe (i.e., transition zone), or the groundwater table. Injection may be accomplished by borehole, probe, or other conduit injection, by pressure injection techniques, such as jet-grouting or borehole mining, or by other injection techniques while augering, boring or drilling into the contaminated medium.

In order to distribute the oxidant to a large volume of contaminated medium, it is required that such injection or introduction of oxidant to the contaminated medium be by spreading the oxidant over the surface of the contaminated medium, pouring the oxidant down previously created boreholes or conduits in the contaminated medium, or introducing the oxidant into a borehole or conduit while drilling or augering such borehole or conduit into the contaminated medium. Any subsurface boreholes or conduits in the contaminated media may be vertical to or horizontal to the surface of the contaminated media. (In the case of a horizontal borehole or conduit, these are normally augured parallel to and from below the natural surface, e.g., into the side of a hill or into the sidewall of an excavation, such as a trench or strip mine.) The injection technique used for any particular application will of necessity be site specific and will depend on many factors, such as area and depth of contamination, type of contaminated medium and other site specific conditions.

One means of oxidant application has been found by the inventors to be most advantageous. The oxidant application means of the present invention is adapted from various known pressure injection techniques, such as jet-grouting and borehole mining techniques. [See U.S. Pat. No. 4,915, 452, by Dibble, issued Apr. 10, 1990; Dibble, M. F., "Borehole Mining: Improved Technology Expands Horizon," SME Preprint 89–227, pp. 313–318 (1991).] Borehole mining involves sinking a borehole through the soil to an ore deposit. A nozzle, which may be attached to the drill stem or free-standing, is then lowered into the hole and the ore deposit is impacted with water or other aqueous solution which is delivered at high pressure. The resulting slurry of solution, soil, rock and ore is pumped to the surface and the ore is separated from the other material.

The borehole mining process is similar to the jet-grouting soil stabilization technique which has been used extensively in Japan for about the past 15 years. The jet-grouting technique is used in soft grounds to construct vertical columns of highly impacted sand, gravel or aggregates. Jet-grouting consists of penetrating a drilling pipe to the required depth in the soil, providing at the bottom of the drill pipe a high-pressure jetstream under a nozzle pressure of 200 tsf to 600 tsf (tons per square feet) to break down the soil structure and mixing the relatively impermeable soil with a grout. The probe used is a high speed grout jet enveloped by a combination of high pressure air and/or water jet-streams together with grouting agents.

Another technique, known as jet-float technology, combines both the high pressure borehole mining technique and the jet-grouting technique to liquefy the subsoil, emulsify the organic contaminants contained in the subsoil and then release the emulsified contaminants to the pore fluid (the water or other liquid which is contained in the void fraction of subsurface soil or rock). [See Acar et al., "Development of Jetfloat Technology in Remediation of Sites Contaminated with Oils and Organics," College of Eng., Louisiana State Univ. (1992).] Thereafter, the pore fluid with the emulsified contaminants is pumped to the surface and remediated via any appropriate conventional technique.

However, neither the prior art of jet-float technology nor the prior art of the borehole mining or jet-grouting techniques suggest the introduction of an oxidant to the subsurface for the purpose of oxidation of subterranean contaminants and subsequent recovery of both oxidized and volatilized contaminants by vacuum extraction. Furthermore, both of these methods are ex situ treatment methods of the desired subsurface compound, i.e., ore or emulsified contaminants. Neither of them suggest in situ treatment and capture of the ultimately desired compound.

Figure 4A:
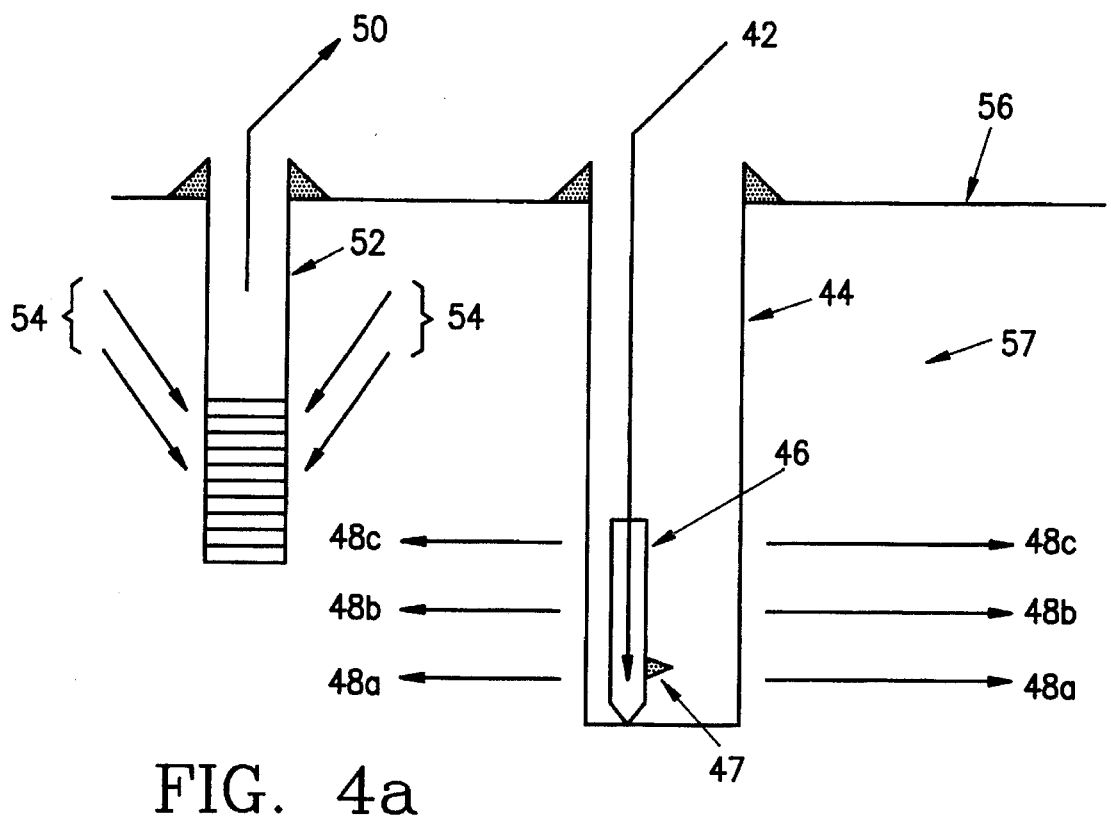
FIG. 4a is a cross-sectional depiction of oxidant injection below the surface 56 of an oxidant 42 at multidepth levels 48a, 48b, 48c, etc. by pressure injection means 46 through nozzle 47 and vacuum extraction 50 through conduit 52 from the vadose zone 57 of the resulting oxidized and volatilized contaminants 54.
Figure 4B:
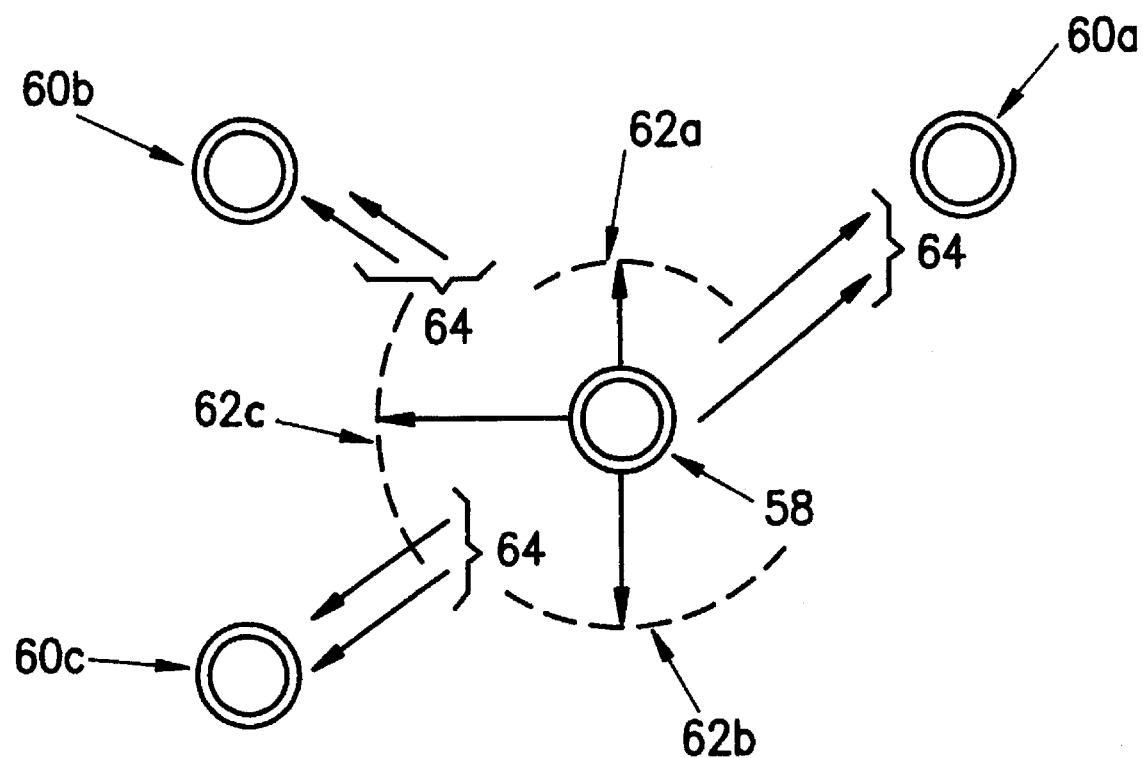
FIG. 4b is a plane view depiction of subsurface injection 58 by pressure injection of an oxidant at multidepth levels 62a, 62b, 62c and vacuum extraction 60a, 60b, 60c from the vadose zone of the resulting oxidized and volatilized contaminants 64.

FIGS. 4a and 4b show how a most preferred embodiment of the decontamination process of the present invention functions. In FIG. 4a a jet-grout probe 46 with a nozzle 47 for dispensing an air and/or liquid mixture containing an oxidant is attached to a drill pipe and lowered into a previously created borehole 44 and below the surface 56. Alternatively, the jet-grout probe 46 with a nozzle 47 may be lowered into a borehole 44 at the same time as and in conjunction with the drilling or augering of the borehole 44. The mixture, preferably, water and hydrogen peroxide (in different amounts and at different solution concentrations depending on factors aforementioned), is jetted into the borehole 44 to create at least one, preferably, more than one, circular, disk-shaped swath 48a, 48b, 48c in the subsurface. The high pressure jet simultaneously cuts a swath 48 of the contaminated soil and introduces an oxidant 42 to the subsurface. After one swath 48 is cut and the oxidant 42 is introduced to the subsurface at a first depth level 48a, the probe 46 is then brought to another, higher depth level 48b in the borehole 44 and a second swath 48b parallel to the first swath 48a is cut and so on 48c. As those skilled in the art will appreciate, there could be numerous parallel swaths 48a, 48b, 48c, etc., cut with the injected mixture. As the contaminants are heated and oxidized, they volatilize in part and are oxidatively broken down in part, in both instances to form vapors 54 which are effectively recovered by an applied vacuum extraction means 50 through at least one vacuum extraction conduit 52 within the vadose zone 57; or possibly even through the same borehole as the injection borehole 44, which might contain a dual system of oxidant injection and vacuum extraction.

FIG. 4b corresponds to and is a plane view depiction of the subsurface pressure injection depicted in FIG. 4a. The oxidant injection site 44 of FIG. 4a corresponds to oxidant injection site 58, the vacuum extraction conduit 52 of FIG. 4a corresponds to the vacuum extraction conduits 60a, 60b, 60c which withdraw the contaminant vapors 64. Radii 62a, 62b, 62c correspond to the swaths 48a, 48b, 48c cut by the jet-grout probe 46 of FIG. 4a.

Figure 2:
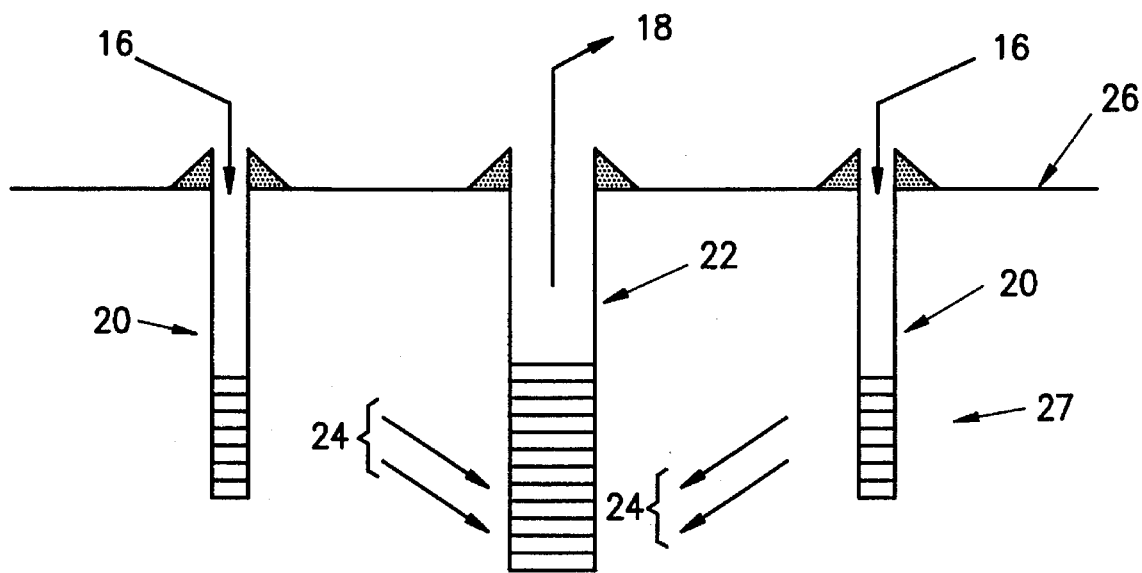
FIG. 2 is a cross-sectional depiction of injection of an oxidant 16 through conduit 20 below the surface 26 and vacuum extraction 18 through conduit 22 from the vadose zone 27 below the surface 26 of the resulting oxidized and volatilized contaminants 24.
Figure 3:
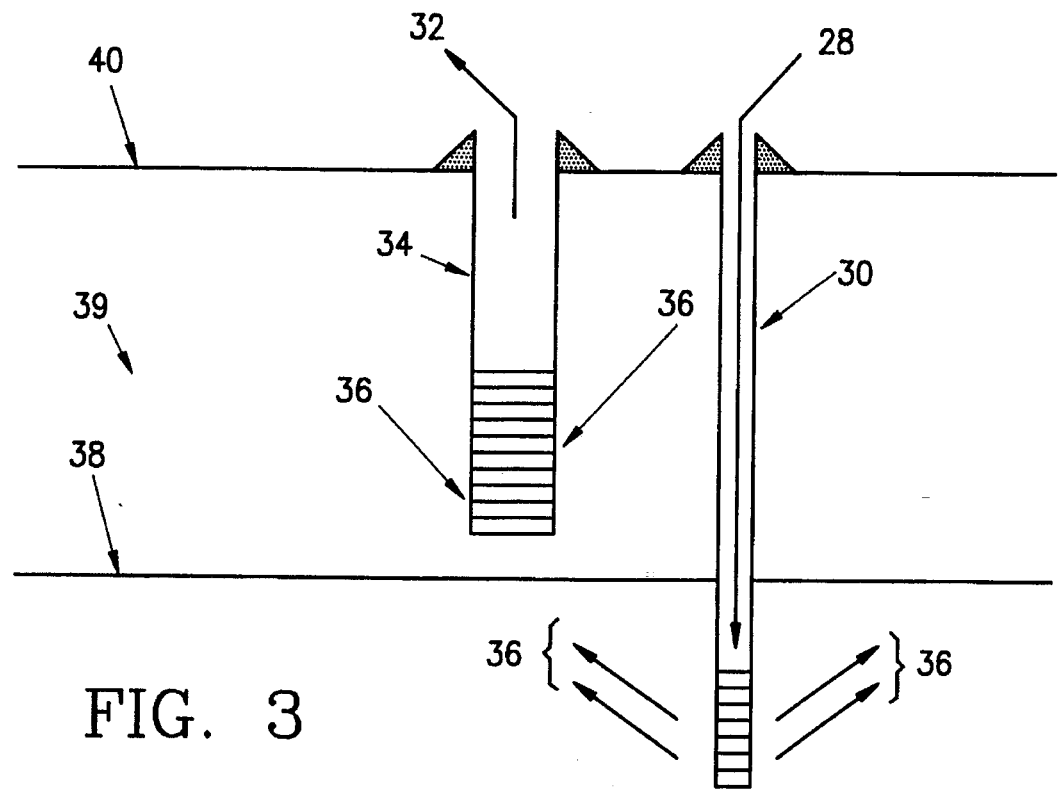
FIG. 3 is a cross-sectional depiction of subsurface injection of an oxidant 28 below the groundwater surface 38 through conduit 30 and vacuum extraction 32 through conduit 34 from the vadose zone 39 below the surface 40 of the resulting oxidized and volatilized contaminants 36.

FIGS. 1, 2 and 3 show how other preferred embodiments of the process of the present invention function. FIG. 1 is a cross-sectional depiction of surface 12 application of an oxidant 6 and vacuum extraction 4 from the vadose zone 11 of the resulting oxidized and volatilized contaminants 8. A water pump 2 may be placed in the vacuum extraction conduit 14 to withdraw groundwater 10.

FIG. 2 is a cross-sectional depiction of injection of an oxidant 16 below the surface 26 and vacuum extraction 18 from the vadose zone 27 of the resulting oxidized and volatilized contaminants 24. The vacuum extraction conduit 22 and the oxidant injection conduits 20 are both within the vadose zone 27 and above the groundwater aquifer.

FIG. 3 is a cross-sectional depiction of subsurface injection of an oxidant 28 below the groundwater table 38 and vacuum extraction 32 from the vadose zone 39 of the resulting oxidized and volatilized contaminants 36. The oxidant injection conduit 30 penetrates the subsurface to below the groundwater table 38 so that the oxidant 28 may be injected below the groundwater table 38. The oxidized and volatilized contaminants 36 will percolate up through the groundwater table 38 to the vadose zone 39. The vacuum extraction means 32 will remove the oxidized and volatilized contaminants 36 from below the surface 40 through the vacuum extraction conduit 34.

EXAMPLES

A series of three field tests were conducted at a site. These involved the in-situ injection of about a 35% hydrogen peroxide ($H_2O_2$) aqueous solution into low permeability (i.e., $k \approx 10^{-6}$ cm/sec) soils which were contaminated with volatile and semi-volatile organic compounds. The tests were conducted to study the synergy between simultaneous in situ oxidation and vacuum extraction together. In overview, the tests showed that contaminant concentrations in the soil could be significantly reduced by the addition of $H_2O_2$ in conjunction with vacuum extraction. Results from the third field test performed showed that volatile organic compound concentrations in the soil were reduced by about 45%.

Field Test Number 1—Single Vertical Conduit Design

With this design about a 35% hydrogen peroxide ($H_2O_2$) solution was added to the subsurface via vertical conduits. The hypothesis was that the $H_2O_2$ would migrate from these conduits or boreholes and oxidize the contaminants present in the subsurface. The system consisted of five, two-inch deep vertical conduits installed at the corners of and in the center of an area of about five feet by about five feet. The boreholes were hand-augured to a depth of about eight feet. Visible dense non-aqueous phase liquids were encountered in three of the five holes. The conduit design consisted of a two-inch PVC (polyvinylchloride) riser installed to a depth of about three feet. The annular space between the borehole and the riser was then filled with cement grout. The borehole was left as an open borehole from a depth of about three feet to the bottom of the borehole. In addition to these $H_2O_2$ injection conduits, two short sections of two-inch PVC screen were placed at the surface of the test area and covered with sand. The purpose of the sand-covered screens was to catch any volatile organic compound emissions which might not be captured by the vacuum extraction system. Two additional boreholes were hand-augured to provide pretreatment soil samples for the test. In addition to the $H_2O_2$ injection conduits, ten thermocouples were installed at various depths and distances from the injection conduits to track the subsurface reaction.

Initially, $H_2O_2$ was added to only one of the five installed injection conduits. About 2.7 gallons of $H_2O_2$ were added to the center conduit.

After the first injection of $H_2O_2$ to the center injection conduit, a subsurface reaction was evident as some of the thermocouples recorded a temperature increase. The closest thermocouple to the injection conduit showed a temperature increase up to about 21.1° C. over ambient. This temperature excursion was observed during the first hour of the test. The thermocouple was about one foot away from the injection conduit.

Based on this indication that the $H_2O_2$ could be safely handled and that the reaction could be controlled, $H_2O_2$ was then added to all five of the injection conduits. One thermocouple was installed directly inside one of the injection conduits to evaluate temperature effects directly at the point of injection. A total of about 23.5 gallons were added to the test area.

After the second $H_2O_2$ addition to all five of the injection conduits, a temperature excursion of up to about 62.8° C. over ambient was observed in some of the conduits. Elevated temperatures were also seen in surrounding thermocouples.

Soil samples taken after the subsurface temperatures had returned to normal, ambient temperatures showed upon analysis that no significant clean-up of soil contaminants had occurred. The soil samples were taken in the same vicinity as the pre-test samples. There were no ground to air emissions during this test.

This vertical conduit method of $H_2O_2$ application may not be a very effective technique for these low permeability soils, because of the rather low zone of influence by the vacuum extraction system, the failure of the $H_2O_2$ added by this technique to migrate very far from the injection conduit, and the fact that post-treatment soil samples showed that no significant clean-up of soil contaminants had occurred. As a result, this vertical conduit design for $H_2O_2$ application does not appear to be the most effective enhancement to the vacuum extraction system at this particular site.

Field Test Number 2—Horizontal Conduit Design

For this design a conduit was installed horizontally into the contaminated medium and the open area screen of the conduit was placed at or near a known dense non-aqueous phase liquid layer. The hypothesis was that the $H_2O_2$ could migrate from the conduit and drain by gravity directly down into the dense non-aqueous phase liquid layer. The test area contained a significant amount of dense non-aqueous phase liquids at a depth of from about four feet to about six feet below the surface. Pre-treatment soil samples were again taken. Then one horizontal conduit (that is, a conduit which is parallel to the surface of the earth), with a diameter of about four inches and a screened length of about eight feet, was installed at a depth of about four and a half feet below the surface. Thermocouples were installed in four locations which formed a line perpendicular to the horizontal conduit. About 37 gallons of $H_2O_2$ were added to the conduit.

No significant temperature increase was observed until about three and a half hours after the $H_2O_2$ addition. At this time there was a temperature rise of up to about 60° C. over ambient. Hydrogen peroxide was also observed to be bubbling up out of cracks in the soil surface and around the thermocouples and horizontal conduit risers at this time.

This phenomenon was observed to continue for about three more hours. A small safety tent was erected over the area to capture and control the volatile organic compound emissions. Portable $O_2$ and $CO_2$ meters were used to analyze the gases being produced and the conduit-head vapor from nearby vacuum extraction conduits. Both meters showed elevated levels of $O_2$ and $CO_2$, indicating both the oxidation of organic carbon, and the degradation of $H_2O_2$ itself. Higher subsurface vacuum conditions were required to control fugitive emissions to the atmosphere.

Once the subsurface thermocouples returned to normal temperatures, post-treatment soil samples were taken. These soil samples showed an average decrease in trichloropropane (TCP) concentration of as much as about 23% (TCP was the predominant contaminant at this particular site).

The post-treatment soil samples of the horizontal injection method showed better results than the former test which used a single vertical conduit. However, it was determined that much of the added $H_2O_2$ was being lost out of surface fractures. Finally, it was concluded that much of the area was not coming in contact with the applied $H_2O_2$. It was also concluded that there was virtually no way to control where the $H_2O_2$ went after $H_2O_2$ was added to the conduit. Hydrogen peroxide was obviously seeking the path of least resistance as would any flowing fluid. As a result, an alternative test design was planned and implemented.

Field Test Number 3—Multiple Vertical Conduit Design

To increase the amount of soil contacted by the $H_2O_2$, the plan for Field Test Number 3 was to apply $H_2O_2$ into several small diameter, relatively shallow, vertical conduits or boreholes. In an evenly spaced grid a total of 36 boreholes of about two-inches in diameter were drilled in an area of about five feet by about five feet. The spacing of the boreholes was about one foot apart and the depth of the boreholes was about three feet. Due to the potential release of contaminated vapors to the atmosphere if the vacuum extraction system did not operate properly, a small containment dike with a plastic cover was installed around and over the test area. A vacuum line was connected to the covered area to capture any fugitive vapor emissions. No thermocouples were installed for this test.

A total of about 19 gallons of $H_2O_2$ were added to the area. The hydrogen peroxide was added to each borehole until it was full. There was an obvious heat build-up as evidenced by steam production, as well as the characteristic bubbling effect which was observed to occur about fifteen minutes into the test. The reaction appeared to be complete about one and a half hours after the start of the test. During the entire test, volatile organic compound samples were taken from the vacuum lines connected to the test area. Carbon dioxide readings taken periodically from the vacuum line revealed elevated $CO_2$ levels, indicating that organic degradation was occurring.

Post-treatment soil samples showed an average decrease in TCP concentration of up to about 45%. The greatest decrease in TCP concentration was observed to occur at a depth of from about four feet to about six feet below the surface.

This third test using several small vertical boreholes for $H_2O_2$ application showed the most favorable results of the three tests when considering overall TCP reduction. A comparison of the mass balance of the volatile organic compound extraction rates by the vacuum extraction system (as determined from samples taken from the vacuum line) with the decrease in the actual concentration of volatile organic compounds in the soil, indicated that the contaminants could be recovered effectively by the vacuum extraction process. Mass balance, as used herein, is a comparison of the mass of contaminants recovered from the soil, as measured by analyses of before and after soil samples, to the mass of contamination removed in liquid and vapor form by the vacuum extraction system. Other observations indicate that the contaminants are being volatilized, or partially or completely oxidized to $CO_2$ and water in the subsurface. The fact that elevated $CO_2$ readings were observed supports the conclusion that some of the contaminants were biodegraded. However, it was not possible to establish whether the $CO_2$ was coming from contaminant oxidation, or some other organic material breakdown. The significantly lower volatile organic compound concentrations in the soil; however, indicate that the contaminants were effectively recovered by the vacuum extraction system or destroyed in situ.

The embodiments illustrated and discussed in the specification and the preceding examples are intended only as exemplary and the many other feasible embodiments within the scope of this invention will be readily understood and appreciated by those skilled in the art. Nothing in the specification should be considered as limiting the scope of the present invention. Many changes may be made by those skilled in the art to produce highly effective systems, without departing from the invention. The present invention should be limited only by the following claims:

We claim:

1. An in situ process for removing one or more volatile, semivolatile or nonvolatile organic contaminants present in liquid, semisolid or solid form in a contaminated subsurface zone, which process comprises the steps of:

(a) introducing into said contaminated subsurface zone an oxidant having the capability to react exothermically with said contaminants to form oxidation products thereof;

(b) allowing said oxidant to react exothermically with said contaminants to form oxidation products;

(c) installing at least one vacuum extraction well into the contaminated subsurface zone or into another subsurface zone at a position proximate to the position in the contaminated zone at which oxidant was introduced;

(d) applying to the top of said vacuum extraction well a vacuum that is sufficient to create a negative pressure gradient in the subsurface; and (e) removing through said vacuum extraction well to the surface oxidation products of said contaminants.

2. The process of claim 1 in which said oxidant is hydrogen peroxide.

3. The process of claim 2 in which Fenton's reagent is also present.

4. The process of claim 1 in which steps (b) and (d) are conducted simultaneously.

5. The process of claim 1 wherein the contaminated subsurface zone is a subsurface vadose zone, the vacuum extraction well extends into said vadose zone and the vacuum applied is effective to volatilize volatile contaminants present and to draw substantial quantities of air through said vadose zone.

6. The process of claim 1 wherein the said oxidant is introduced by injecting it below the surface of the water table through at least one conduit which extends into said water table.

7. The process of claim 6 wherein said conduit which extends into said water table is contained in an injection borehole that also acts as a vacuum extraction well through which groundwater containing oxidation products of said contaminants is withdrawn.

8. The process of claim 7 wherein another vacuum extraction well also extends into a proximate position in the vadose zone and removal of oxidation products of said contaminants in vapor form is effected therethrough.

9. The process of claim 1 wherein said oxidant is introduced into the subsurface capillary fringe zone.

10. The process of claim 1 wherein said vacuum extraction well extends into a proximate position in the vadose zone and removal of vaporized oxidation products of said contaminants is effected therethrough.

11. The process of claim 1 wherein said oxidant is introduced in liquid form by spreading said liquid on the surface of the ground above said contaminated subsurface zone and allowing it to seep into said subsurface zone.

12. The process of claim 1 wherein aerobic bacteria in the contaminated subsurface zone concomitantly act to biodegrade a portion of the contaminants present.

13. The process of claim 1 wherein said oxidant is introduced to the contaminated subsurface zone by means of at least one injection well.

14. The process of claim 1 wherein said oxidant is introduced to the contaminated subsurface zone by means of pressurized injection thereof.

15. The process of claim 14 wherein said oxidant is introduced into the contaminated subsurface zone using a jet grouting technique.

16. The process of claim 1 wherein said oxidant is introduced to the contaminated subsurface zone through at least one horizontally sited conduit located beneath the surface and provided with perforations throughout at least a portion of its length, through which said oxidant is caused to percolate into the subsurface beneath it.

17. The process of claim 1 wherein said oxidant is introduced into the contaminated subsurface zone at a plurality of points and at more than one subsurface depth.

18. The process of claim 1 further comprising the step of treating the effluents from step (e) to remove or otherwise render harmless the vaporized contaminants contained therein.

19. The process of claim 1 further comprising the step of discharging to the atmosphere vaporized oxidation products of contaminants.

20. The process of claim 1 wherein the heat generated in the exothermic reaction of step (b) is controlled within a temperature range of from about 10° C. to about 35° C.

21. The process of claim 1 wherein said oxidant is introduced to the contaminated subsurface zone through at least one horizontally sited conduit located beneath the surface and provided with perforations throughout at least a portion of its length, through which said oxidant is caused to flow into the subsurface.

22. The process of claim 7 further comprising the step of treating at the surface said groundwater containing oxidation products of said contaminants to remove oxidation products.

23. The process of claim 1 wherein volatilized organic contaminants are also removed through said vacuum extraction well.

* * * * *